March 3, 1970

S. M. BLOOM ET AL 3,498,785

NOVEL PHOTOGRAPHIC PRODUCTS AND PROCESSES

Filed Jan. 8, 1969

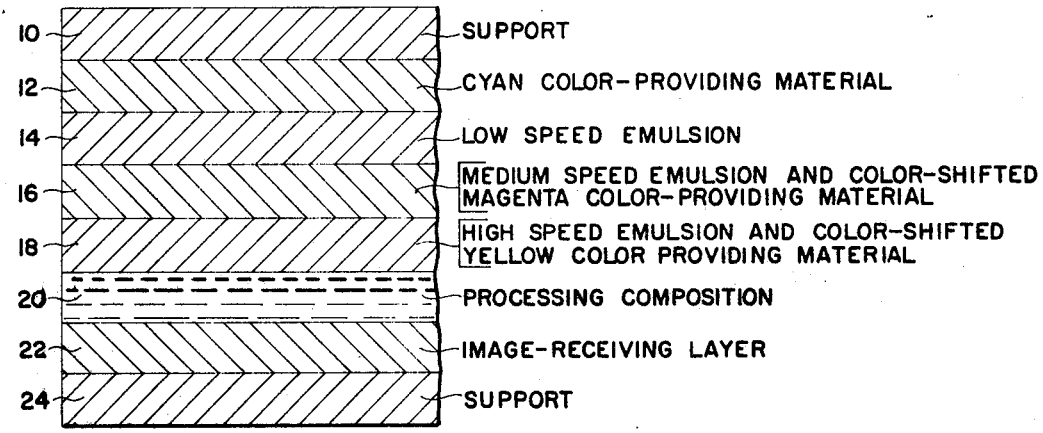

- 10 — SUPPORT
- 12 — CYAN COLOR-PROVIDING MATERIAL
- 14 — LOW SPEED EMULSION
- 16 — MEDIUM SPEED EMULSION AND COLOR-SHIFTED MAGENTA COLOR-PROVIDING MATERIAL
- 18 — HIGH SPEED EMULSION AND COLOR-SHIFTED YELLOW COLOR PROVIDING MATERIAL
- 20 — PROCESSING COMPOSITION
- 22 — IMAGE-RECEIVING LAYER
- 24 — SUPPORT

INVENTORS
STANLEY M. BLOOM
and
BY  ROBERT K. STEPHENS
Brown and Mikulka
and
Alvin Isaacs
ATTORNEYS

United States Patent Office 3,498,785
Patented Mar. 3, 1970

3,498,785
NOVEL PHOTOGRAPHIC PRODUCTS AND PROCESSES
Stanley M. Bloom, Waban, and Robert K. Stephens, Burlington, Mass., assignors to Polaroid Corporation, Cambridge, Mass., a corporation of Delaware
Continuation-in-part of application Ser. No. 655,501, July 24, 1967. This application Jan. 8, 1969, Ser. No. 789,837
Int. Cl. G03c 7/00, 5/54, 1/48
U.S. Cl. 96—3          25 Claims

ABSTRACT OF THE DISCLOSURE

This invention relates to novel photographic systems for obtaining color transfer images of varying color depending upon the degree of exposure, e.g., for recording the dosage or amount of exposure to actinic light.

---

This application is a continuation of U.S. application Ser. No. 655,501, filed July 24, 1967, now abandoned in the names of Stanley M. Bloom and Robert K. Stephens.

BACKGROUND OF INVENTION

The copending application of Stanley M. Bloom, Ser. No. 655,338 filed concurrently describes and claims a novel class of compounds which may be defined as being relatively immobile and non-diffusible silver halide developing agents containing a color-providing moiety and which are capable of providing, upon development of an exposed silver halide emulsion, an oxidation product which can auto-react intramolecularly to form a new heterocyclic ring and as a function of such reaction to split off a mobile and diffusible color-providing material.

These compounds may be represented by the following formula:

(A)

wherein:

A and $A^1$ each represent the atoms necessary to complete a benzene or naphthalene ring, which ring may be further substituted; D is a color-providing moiety, e.g., a complete dye such as a monoazo, disazo or anthraquinone dye which may, if desired, be metallized in known manner;

Y is any substituent which completes or forms an amide with, and reduces the basic character of the amino group in the 3-position, such as the residue of an acid, linking the color-providing moiety D to the 3-nitrogen atom, and which is capable of being eliminated during the ring formation to be described with more particularity hereinafter, e.g., $$-\overset{O}{\underset{\|}{C}}-;\ -\overset{O}{\underset{\|}{C}}-O-;\ -\overset{O}{\underset{\|}{C}}-\overset{O}{\underset{\|}{C}}-O-;\ -\overset{O}{\underset{\underset{O}{\|}}{S}}-;\ -\overset{O}{\underset{\underset{OH}{|}}{P}}-O-;\ -\overset{O}{\underset{\underset{O\text{-lower alkyl}}{|}}{P}}-O-;\ \text{etc,}$$

R and $R^4$ each represent an "anchoring" or immobilizing substituent rendering the compound nondiffusible, e.g., higher alkyl such as decyl, dodecyl, stearyl, oleyl, etc.

linked directly to the aromatic nucleus or linked indirectly thereto through an appropriate linking group, e.g.,

etc., an aromatic ring, e.g., of the benzene or naphthalene series, or a heterocyclic ring, which rings may be either bonded to a single carbon atom of the aromatic nucleus or fused thereto, i.e., bonded to a pair of adjacent carbon atoms, or R and/or $R^4$ may be a plurality of short chain radicals which together provide the anchoring moiety, each of said short chain radicals being linked directly or indirectly to a different carbon atom of the aromatic nucleus formed by the A and $A^1$ moieties;

X is hydrogen, hydroxy or amino, e.g., a primary, secondary or tertiary amino substituent of the formula:

$$-N\overset{R^3}{\underset{R^3}{\diagdown}}$$

wherein each $R^3$ may be hydrogen, a hydrocarbon radical, e.g., alkyl, such as methyl, ethyl, butyl, dodecyl, etc., aryl such as phenyl or naphthyl attached through a carbon atom thereof to the nitrogen atom, a cyclic alkyl such as cyclopentyl or cyclohexyl, i.e., where both $R^3$'s are alkylene comprising together with the nitrogen atom a heterocyclic ring, a substituted alkyl, such as hydroxyethyl, methoxyethoxyethyl, polyglycoloxyethyl, carboxymethyl, benzyl, phenylethyl, sulfo-phenylethyl, acetylaminophenylethyl, succinylamino-phenylethyl, furanemethyl, etc.; or a substituted aryl such as methylphenyl, ethylphenyl, etc.; or said anchoring moiety R;

$X^2$ is hydrogen, hydroxy, an amino group such as may be contained by said X moiety, as previously described, or said anchoring moiety $R^4$, provided that at least one of X and $X^2$ is hydroxyl or amino;

$R^1$ is hydrogen, an alkyl such as methyl, ethyl, propyl, butyl, hexyl, octyl, dodecyl, cyclohexyl, etc.; or a substituted alkyl such as 2-hydroxyethyl, 3-dihydroxypropyl, carboxymethyl, carboxyethyl, carboxybutyl, carboxydecyl, hydroxyethyl-ether, polyglycoloxyethyl, furanemethyl, benzyl, phenylethyl, carboxyphenylethyl, sulfo-phenylethyl, acylaminophenylethyl, etc.; and $n$ and $n^1$ each is a positive integer from 1 to 2, provided that when $R^1$ or $R^3$ alone or together comprise one of those heretofore named substituents rendering the compound non-diffusible, either or both of $n$ and $n^1$ may be 1 but when $R^1$ and $R^3$ alone or together do not provide such an anchoring moiety at least one of $n$ and $n^1$ must be 2.

The copending application of Stanley M. Bloom and Robert K. Stephens, Ser. No. 655,338, filed concurrently, relates to photographic processes for obtaining negative color transfer images employing a photosensitive element comprising at least one light-sensitive silver halide emulsion and an associated layer containing one of the aformementioned compounds. When a photosensitive element of this description is exposed and then developed by spreading between the thus exposed element and a superposed image-receiving layer, an aqueous alkaline processing composition containing a silver halide developing agent, the oxidation product of which is reducible, but containing no silver halide solvent, exposed silver halide is reduced to silver and as a function of development the developing agent is in turn oxidized to provide an imagewise distribution of oxidized developing agent in terms of exposed areas of the silver halide emulsion. This imagewise distribution of oxidized developing agent migrates, at least in part, to the layer containing the said compound where a redox reaction occurs in which the developing agent is reduced and the said compound in turn oxidized in an imagewise pattern corresponding to exposed areas of the emulsion. This oxidation product then ring-closes in the previously described manner with elimination of the diffusible dye which is then free to transfer, by imbibition, to the superposed image-receiving layer to form a negative transfer image thereon.

The procedures described in the latter copending application may be employed in the preparation of color radiographs.

SUMMARY OF THE INVENTION

According to the present invention, the compounds and procedures described in the aforementioned applications are adapted to novel systems for recording visual images of varying colors according to the degree or extent of exposure to actinic light. Of particular interest in the practice of this invention are the fields of dosimetry or radiation detection and radiography.

The present invention utilizes a photosensitive element containing at least two silver halide emulsion layers of varying or different speeds, e.g., a light-sensitive silver halide emulsion layer of relatively high speed or sensitivity to light, and at least one other emulsion layer of lesser speed or sensitivity to light, each of these layers having associated therewith in the same or in an adjacent layer, one of the aforementioned color-providing materials, each of these materials exhibiting different spectral absorption characteristics.

When this photosensitive element is exposed to a relatively low intensity of light, only the first-named (high speed) emulsion layer contains an image developable to any appreciable extent. When this photosensitive element is then processed in the manner described in the Background of the Invention, a transfer image is obtained in terms of the color-providing material associated with this emulsion layer. If, on the other hand, the photosensitive element is exposed to actinic light of greater intensity sufficient to provide a developable image in more than one of the emulsion layers, upon processing of the thus exposed element, a transfer image is obtained in terms of color-providing material associated with each of the exposed emulsion layers containing a developable image, the color of the transfer image being a product of the spectral absorption characteristics of the transferred color-providing materials.

BRIEF DESCRIPTION OF DRAWING

The figure is a partially schematic, partially enlarged fragmentary sectional view illustrating a previously exposed photographic product of this invention during processing thereof.

DESCRIPTION OF PREFERRED EMBODIMENT

In the prefered embodiment, the photosensitive element contains a high-speed emulsion layer, a medium speed emulsion layer, and a low speed emulsion layer, each layer having a color-providing material of markedly different color associated therewith; and the resulting element is employed in procedures for recording the extent of exposure to penetrating ionizing radiation, e.g., as a dosimeter or in the preparation of monochromatic or multicolor radiographs. The two color-providing materials positioned closest in the element to the source of exposing radiation are preferably but not necessarily color-shifted so as to be substantially colorless during photoexposure in order to facilitate photoexposure of the underlying emulsion layers, the desired color of these materials being obtained at some time during or after processing.

As will be apparent from the foregoing description, this invention relates to novel systems for obtaining a visible recordation in color of the amount or intensity of exposure of a photosensitive element to actinic light.

A primary object of this invention is to provide novel products and processes of the aforementioned description.

Another object is to provide novel systems for recording the extent of exposure to penetrating ionizing radiation.

Still another object is to provide novel systems for determining the amount or extent of radiation present, e.g., dosmietry.

Yet another object is to provide novel systems for obtaining multicolor radiographs.

A still further object is to provide a novel photographic product comprising a photosensitive element including at least two light-sensitive silver halide emulsions of varying sensitivity to light, each of said emulsions having associated therewith a layer of a non-diffusible color-providing material which is capable of providing an oxidation product which can auto-react intramolecularly to effect ring-closure and to eliminate the color-providing moiety of said material for transfer, said material in each of said layers having appreciably different spectral absorption characteristics.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing.

According to the present invention the aforementioned objectives are accomplished by providing a photosensitive element containing a light-sensitive silver halide emulsion layer of relatively high speed or sensitivity to light and at least one other emulsion layer of lesser speed or sensitivity to light, each of these layers having associated therewith in the same or in an adjacent layer one of the aforementioned color-providing materials of Formula A, each of these materials exhibiting different spectral absorption characteristics. When a photosensitive element of this description is exposed, e.g., to penetrating ionizing radiation with or without the aid of an X-ray intensifier screen, and then developed by spreading between the thus exposed element and a superposed image-receiving layer or dyeable stratum an aqueous alkaline processing composition containing a silver halide developing agent, the oxidation product of which is reducible by a redox reaction with the color-providing material, exposed areas of the respective silver halide emulsions are developed and as a function of development the developing agent is in turn oxidized to provide an oxidation product which is capable of reacting with the associated color-providing material to effect oxidation thereof by a redox reaction, thereby in turn effecting ring-closure and subsequent release of a mobile and diffusible color-providing material in terms of exposed areas of associated emulsion layer, which color-providing material is transferred, by imbibition, to the superposed stratum to form a negative color transfer image thereon. Color image formation is predicated upon a differential in mobility or diffusibility of the color-providing material obtained from the redox reaction with oxidized developing agent resulting from development of exposed areas of the associated silver halide emulsion.

When this photosensitive element is exposed to a relatively low intensity of light, only the first-named emulsion layer contains an image developable to any appreciable extent. When this photosensitive element is then processed in the foregoing manner a transfer image is obtained in terms of the color-providing material associated with this emulsion and the resulting image may thus be regarded as a monochrome. If, on the other hand, the photosensitive element is exposed to actinic light of greater intensity sufficient to provide a developable image in more than one of the emulsion layers, upon processing of the thus exposed element the transfer image is obtained in terms of color-providing material associated with each of the exposed emulsion layers containing a developable image, the color of the transfer image being a product of the spectral absorption characteristics of the transferred color-providing materials. Where the photosensitive element is so exposed uniformly the resulting transfer image will again be a monochrome but of a color different from that obtained where the photosensitive element is exposed to light of lower intensity, as mentioned previously. On the other hand, where the photosensitive element is selectively exposed to light of varying intensities the resulting image will, therefore, be a multicolor image in terms of the areas of differential intensity of exposure.

The invention will be more readily understood by reference to the accompanying drawing which shows, during processing thereof, a photosensitive element containing, for purposes of illustration, three light-sensitive silver halide emulsions of varying speed or sensitivity to light, each emulsion having associated therewith one of the aforementioned color-providing materials of different spectral absorption characteristics.

The photosensitive element is shown to contain a support 10 having thereon a layer 12 of a cyan color-providing material, a low speed silver halide emulsion layer 14, a layer 16 containing a medium speed silver halide emulsion and color-shifted magenta color-providing material and a layer 18 containing a high speed silver halide emulsion and a color-shifted yellow color-providing material. Processing of this photosensitive element is shown to be effected by spreading an aqueous alkaline processing composition 20 between the exposed element and a superposed image-receiving layer 22 contained on a suitable support 24.

To facilitate or to intensify the exposure of the photosensitive element, an X-ray intensifier screen may be employed. As is known in the art, such a screen fluoresces or emits visible light when excited by X-radiation or other penetrating ionizing radiation and thus serves to lower the amount of exposure or dosage necessary to provide a developable image of the desired density. The intensifier screen, which may, for example, comprise a barium sulfate/lead sulfate mixed phosphor, is preferably positioned in close optical proximity to the photosensitive element. It may, for example, be present as a separate element for use with a photosensitive element such as is shown in the drawing, or it may be an integral part of the photographic product, e.g., be contained initially in either the photosensitive element or between the image-receiving layer and its support, as is known in the art.

Each of supports 10 and 24 may comprise known materials for this purpose, e.g., films of cellulose nitrate, cellulose acetate, polyvinyl acetal, polystyrene, polyethylene, polyethylene terephthalate, polyethylene polypropylene, etc., paper, glass and other such opaque or transparent materials.

As used herein, the terms "high speed," "medium speed" and "low speed" are relative terms, defining the relative speeds with respect to one another.

Light-sensitive emulsion layers of the foregoing description are per se known in the art and hence comprise no part of the present invention. The high speed emulsion in layer 18 may comprise one of the known silver iodobromide emulsions, e.g., having an ASA speed rating of 3000 or greater; the medium speed may comprise one of the known silver bromide emulsions, e.g., 75–100 ASA; and the low speed may comprise one of the known silver chloride emulsions, e.g., having an ASA rating of on the order of 5. The respective emulsions are preferably selected so that there are at least five photographic stops on a standard step wedge between each emulsion, each of the stops being a 50% decrease (or 100° ineach is at least sensitive to light in the visible region of the spectrum corresponding to the light emitted by the intensifier screen, if one is employed. To this end, various sensitizers and hypersensitizers may be employed in the respective emulsion layers.

The dispersing agent or substrate for the silver halide and/or color-providing material may be gelatin or any other colloidal material heretofore employed for such purposes.

Image-receiving layer 22 also comprises one of the image-receiving layers or dyeable strata heretofore known crease) in exposure over the next adjacent stop. Each of the emulsions may be pan sensitive and, in any event, in the art.

The processing composition 20 for developing the exposed element comprises at least an aqueous alkaline solution of a silver halide developing agent the oxidation product of which is reducible during the aforementioned redox reaction. The alkaline material may, for example, be sodium hydroxide, potassium hydroxide or any of the other alkaline materials heretofore employed in such compositions. Developing agents which are reducible at least by the redox reaction and hence capable of oxidizing the color-providing material to effect ring-closure thereof and consequently to release a mobile and diffusible color-providing material are likewise per se and will be readily suggested to those skilled in the art. By way of illustration mention may be made of dihydroxybenzene developers such as the hydroquinones, aminophenol developers and diamino benzene developers such as 2-amino-5-diethylamino-toluene.

The processing composition may also include additional reagents performing specific desired functions, e.g., viscous film-forming reagents such as hydroxyethyl cellulose, sodium carboxymethyl cellulose, etc., it being understood that any of the named ingredients may be present initially in the film unit, in which case the processing composition containing the developer alkaline material, etc. is formed by contacting the film unit with the aqueous medium therefor. In any event the processing composition may, if desired, be confined in a frangible container or "pod" such as described in, for example, U.S. Patent Nos. 2,543,181 and 2,634,886 issued to Edwin H. Land.

The color-providing materials contemplated for use in the practice of this invention are those mentioned previously as being within the scope of Formula A. These materials and the preparation thereof are described and claimed in the forementioned copending application Ser. No. 655,338.

A preferred group of these materials for use in the present invention may be represented by the following formula:

(B)

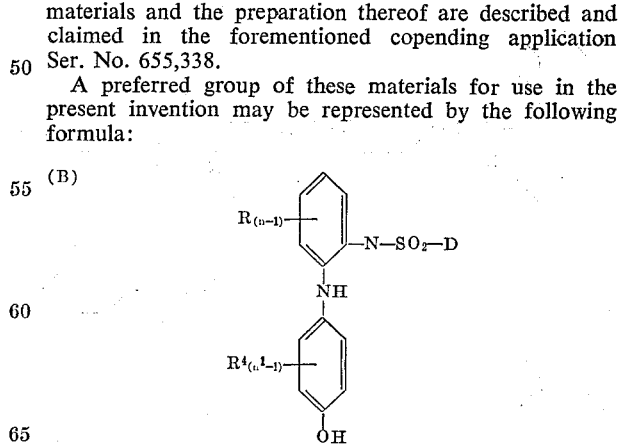

wherein the anchoring moiety R or $R^4$ comprises a long chain amide, e.g., of at least 13 carbon atoms; and nuclear substituted derivatives thereof, e.g., where any of the nuclear carbon atoms of the respective benzene moieties not containing one of the specifically designated substituents may contain a carboxy, alkyl, alkoxy, amino, chloro, hydroxy or amide substituent, etc.

As examples of useful color-providing materials within the above-mentioned formulae, which materials are disclosed in the aforementioned application Ser. No. 655,338, mention may be made of the following:
(1)
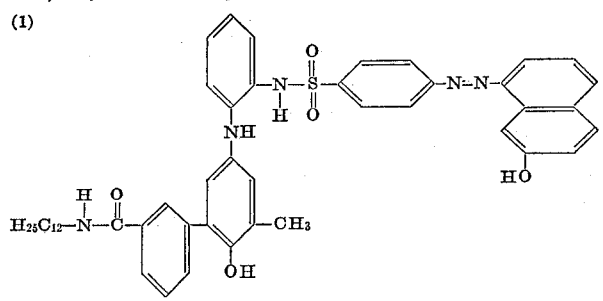
(2)
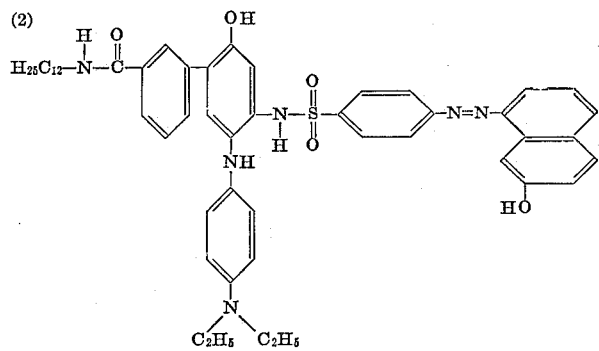
(3)
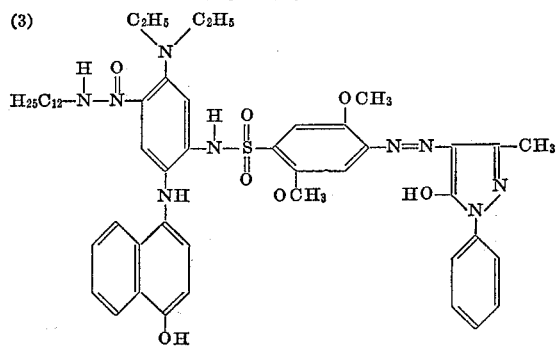
(4)
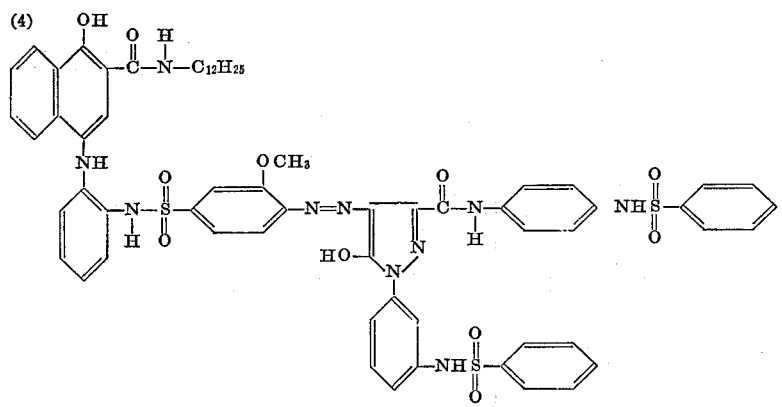
(5)
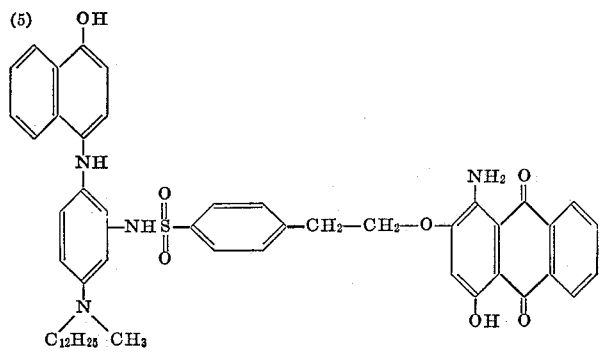

(6) 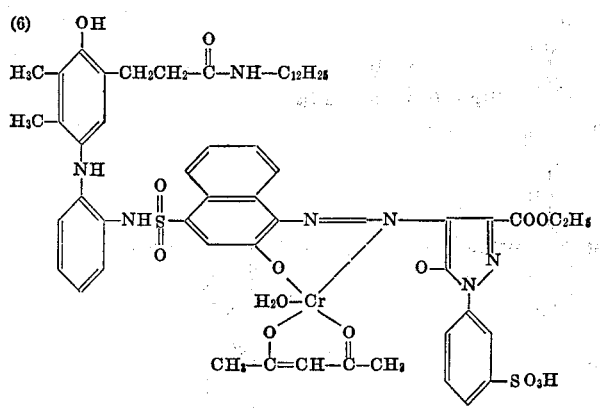
(7) 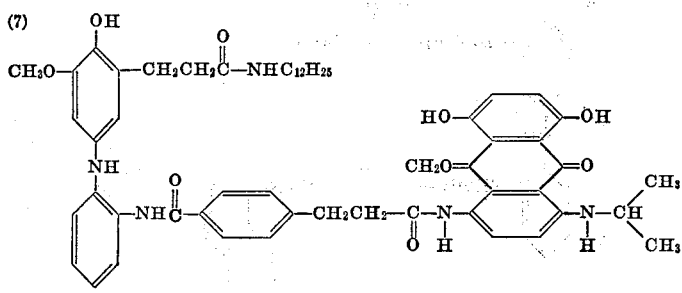
(8) 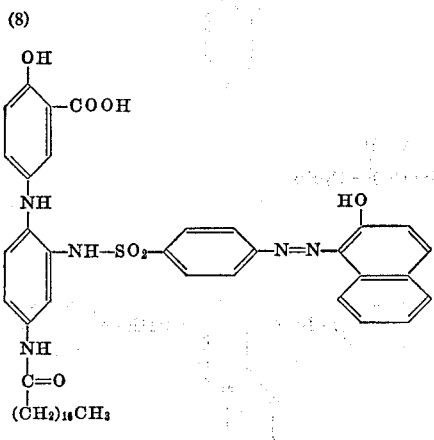
(10) 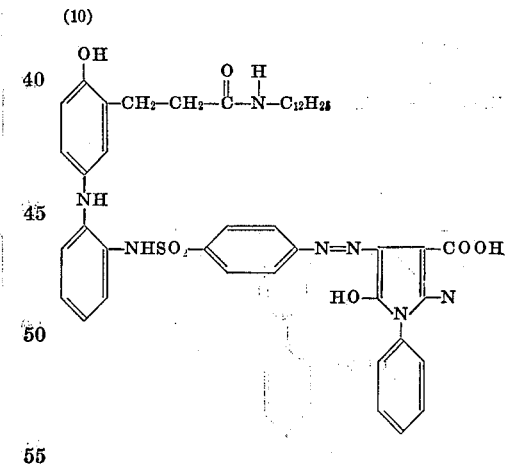
(9) 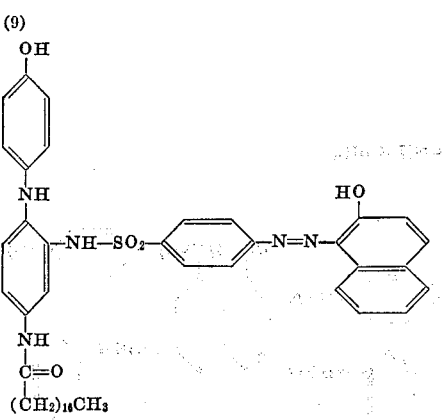
(11) 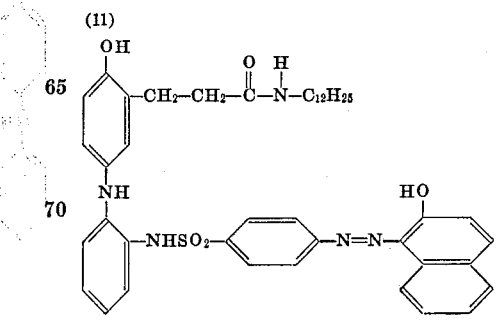

(12)
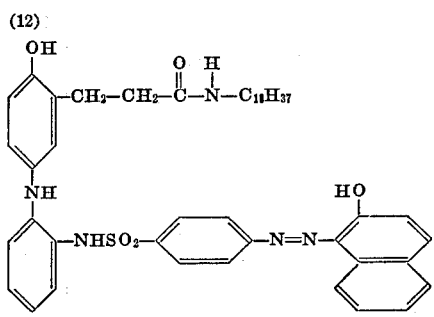
(13)
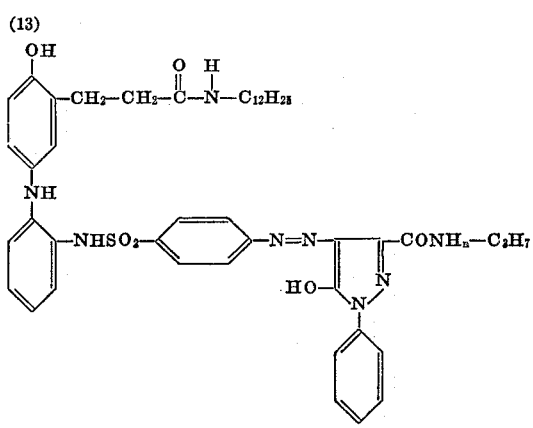
(14)
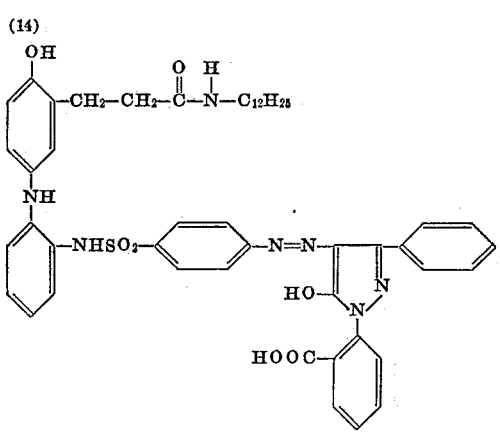
(15)
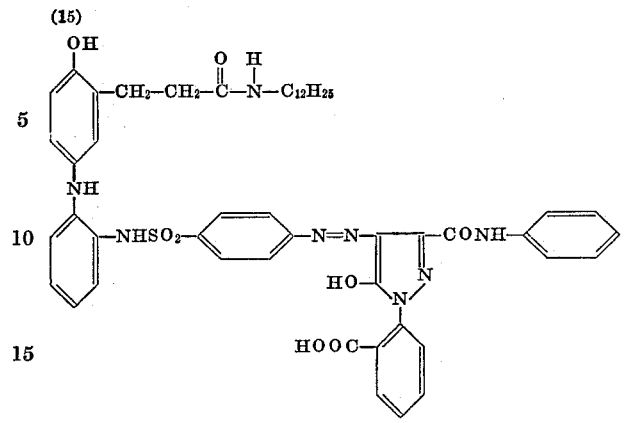
(16)
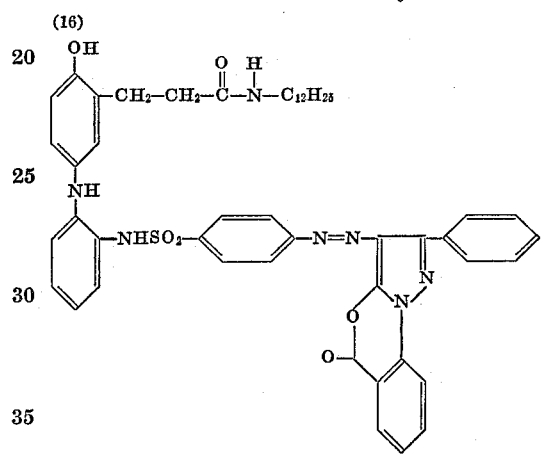
(17)
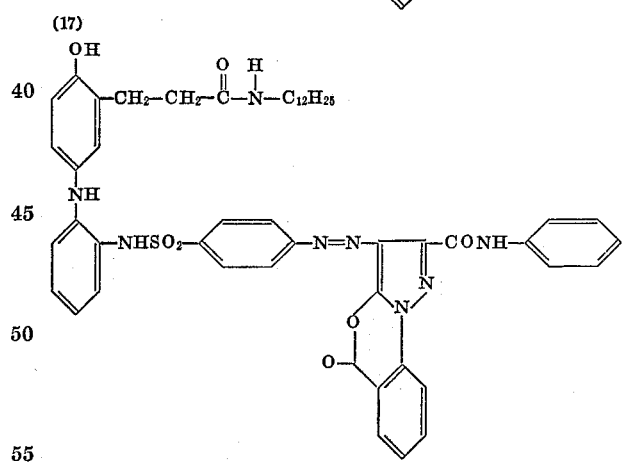
(18)
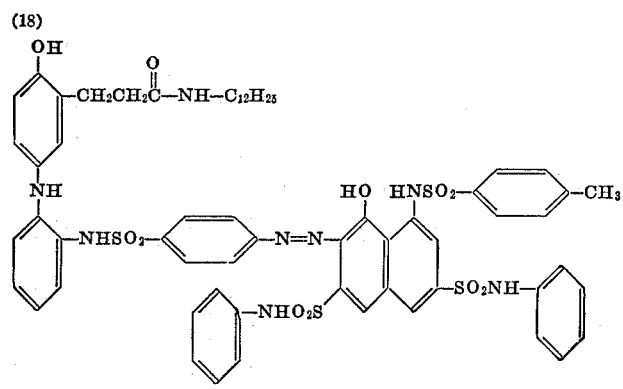

(19)
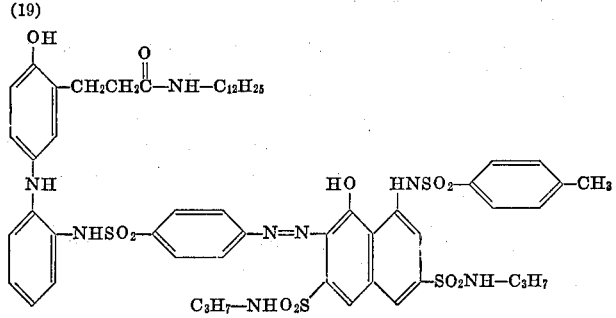

(20)
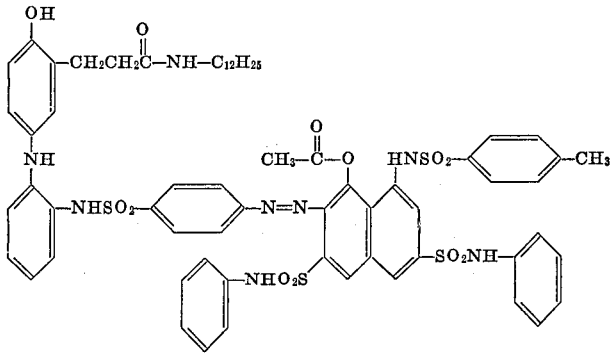

(21)
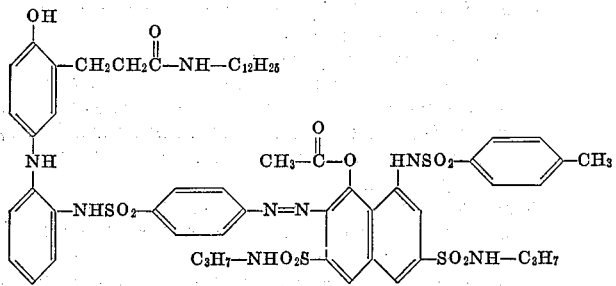

(22)
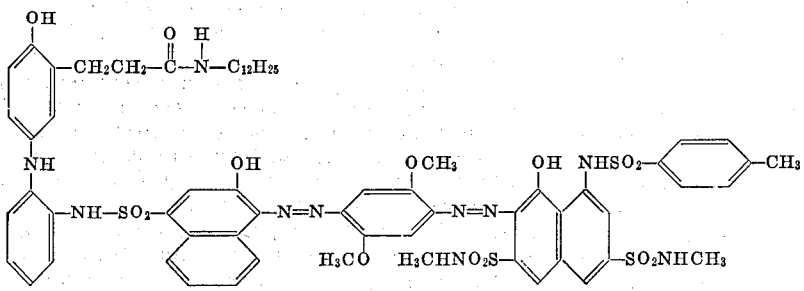

For purposes of illustration the three color-providing materials are shown to contain the dye moieties commonly employed in color processes for preparing faithful color reproductions of the original subject matter, to wit, a yellow, a magneta and a cyan dye moiety. However, since accurate color reproductions are not necessary to the practice of this invention, dye moieties having a $\lambda_{max}$ in any of the regions of the visible spectrum may obviously be employed. It will be appreciated that the dyes selected ideally should exhibit noticeably different or contrasting spectral absorption characteristics for best results.

In any event, to facilitate exposure of the underlying emulsion layer or layers, e.g., layers 14 and 16, the color-providing materials in the layers thereabove, i.e., nearest to the source of actinic light, are preferably but not necessarily initially substantially transparent so as not to absorb any appreciable amount of this actinic light. Accordingly, in the illustrative drawing the color-providing materials in layers 18 and 16 are shown to contain, respectively, a color-shifted yellow and a color-shifted magenta dye moiety. Such compounds are initially substantially colorless so as to preclude unwanted absorption of light but upon subsequent treatment during or after processing undergo a chemical reaction, e.g., hydrolysis, to provide the desired color. Compounds 16 and 17 are illustrative of color-shifted yellow color-providing materials and compounds 20 and 21 are illustrative of color-shifted magenta color-providing materials. Compounds containing such color-shifted dye moieties are described and claimed in United States Patents Nos. 3,230,085 and 3,307,947, respectively.

As was mentioned previously the process of this invention is of particular use in dosimetry. For example, it may be employed to obtain a photograph which will indicate whether any radiation is present at all and, if present, whether the amount of such radiation is safe or whether it is of a lethal dosage. In such a procedure a photosensitive element is exposed and developed in the foregoing manner either automatically or by known means for protecting the user from any radiation present. It will be appreciated that means opaque to visible light but transparent to penetrating ionizing radiation is employed, so that the photosensitive element is exposed only to the latter and to light emitted by the intensifier screen, if such a screen is employed. The color-providing moieties are preselected as desired and the color of the transfer image predetermined at different calibrated dosages as a control or guide. When no radiation is present no dye will transfer. On the other hand if a minimal safe dosage is present, e.g., radiation sufficient to expose only emulsion layer 18, dye will transfer only in terms of the associated color-providing material, e.g., in the above instance the transfer image will be yellow to indicate the presence of this minimal amount of dosage. When a greater dosage is present sufficient to expose layers 18 and 16, color-providing material from the associated layers will transfer to provide a different colored transfer image, e.g., a red image; while if an appreciably greater dosage is present to expose all three emulsions, all three of the respective color-providing materials will transfer to provide a still different color transfer image, e.g., a black image, indicating the presence of a lethal dosage.

While reference has been made above to the uniform exposure of the entire photosensitive element so that no recognizable image is formed on the receiving layer, it will be appreciated that the invention is equally adaptable to procedures wherein an imagewise differential in intensity of exposure is employed to provide a corresponding differential in color of the resulting transfer image.

As was also mentioned previously, the present invention is particularly useful in radiography to prepare color radiographs providing the roentgenologists or other practitioners the desired information. Multicolor radiographs may be obtained, for example, by X-raying parts of the human anatomy or other matter having varying opacity to X-radiation. For example, it is well known that soft tissues and flesh are relatively transparent to X-radiation, whereas bones, vital organs, etc., exhibit varying opacity to X-radiation, thereby making it possible to subject the photosensitive element of this invention to varying intensities of radiation which in turn permits one to obtain a multicolor radiograph wherein the desired information is obtained in contrasting colors making it more readily ascertainable. It may, for example, be employed in such procedures as mammography and other types of examination to determine the presence of tumors and the like.

While the present invention is particularly adaptable to procedures utilizing penetrating ionizing radiation as the initial source of exposing light, it will be appreciated that the present invention is adaptable to various systems using visible light or any other source of actinic radiation to which the layers are sensitive to provide a color image.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A photographic product comprising a photosensitive element including at least two light-sensitive silver halide emulsions, one of said emulsions having appreciably greater sensitivity to actinic light than the other of said emulsions whereby said product is capable of being exposed to actinic light so that only the emulsion layer of greater sensitivity contains an image developable to any appreciable extent, each of said emulsions having associated therewith a layer of a nondiffusible color-providing material which is capable of providing an oxidation product which can auto-react intramolecularly to effect ring closure and to eliminate the color-providing moiety of said material for transfer, said material in each of said layers having appreciably different spectral absorption characteristics.

2. A product as defined in claim 1 wherein said silver halide emulsion of greater sensitivity comprises a relatively high speed emulsion.

3. A product as defined in claim 1 wherein the varying ASA speed equivalents between said respective light-sensitive emulsions is of at least five stops on a standard step wedge.

4. A product as defined in claim 1 wherein said non-diffusible color-providing material is a compound of the formula:

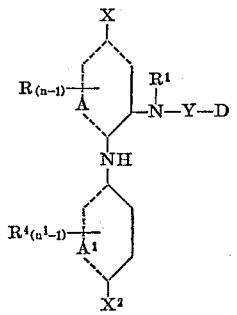

wherein:
each of A and $A^1$ represents the atoms necessary to complete an aromatic ring;
D is a color-providing moiety;
Y is a substituent which completes an amide with and reduces the basic character of the 3-amino substituent bonded thereto, said Y substituent further being a divalent radical linking said D moiety to said 3-nitrogen atom;
X and $X^2$ each is hydrogen, hydroxy, amino or the substituent R, provided that at least one of X and $X^2$ must be hydroxy or amino;
R and $R^4$ each represents an anchoring miety rendering said compound non-diffusible;
$R^1$ is hydrogen, alkyl or substituted alkyl; and
$n$ and $n^1$ each is 1 or 2, provided that when $R^1$ is an alkyl radical or X or $X^2$ is a secondary or tertiary amino comprising an anchoring moiety rendering said compound non-diffusible or when $R^1$, X and $X^2$ together contribute an anchoring moiety, $n$ and $n^1$ may be 1, but when said substituents alone or together do not contribute an anchoring moiety at least one of $n$ and $n^1$ must be 2.

5. A product as defined in claim 1 including an image-receiving element adapted for formation thereon of a color transfer image by spreading an aqueous alkaline processing composition between said respective elements.

6. A product as defined in claim 5 including means for applying an aqueous alkaline processing composition between said elements.

7. A photographic product comprising a support having on one side thereof a layer containing a first light-sensitive silver halide emulsion, a layer containing a second light-sensitive silver halide emulsion of appreciably less emulsion speed than said first emulsion, and a layer containing a third light-sensitive silver halide emulsion of appreciably less emulsion speed than said second emulsion, each of said emulsion layers having associated therewith in the same or in an adjacent layer a nondiffusible color-providing material which is capable of providing an oxidation product which can auto-react intramolecularly to effect ring closure and to eliminate the color-providing moiety of said material for transfer, each of said color-providing moieties having appreciably different spectral absorption characteristics.

8. A product as defined in claim 7 wherein each of said color-providing materials is a compound of the formula:

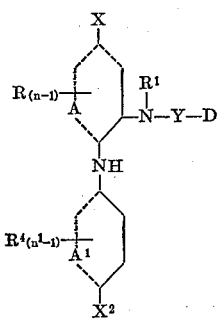

wherein:
each of A and A¹ represents the atoms necessary to complete an aromatic ring;
D is a color-providing moiety;
Y is a substituent which completes an amide with and reduces the basic character of the 3-amino substituent bonded thereto, said Y substituent further being a divalent radical linking said D moiety to said 3-nitrogen atom;
X and X² each is hydrogen, hydroxy, amino or the substituent R, provided that at least one of X and X² must be hydroxy or amino;
R and R⁴ each represents an anchoring moiety rendering said compound non-diffusible;
R¹ is hydrogen, alkyl or substituted alkyl; and
$n$ and $n^1$ each is 1 or 2, provided that when R¹ is an alkyl radical or X or X² is a secondary or tertiary amino comprising an anchoring moiety rendering said compound non-diffusible or when R¹, X and X² together contribute an anchoring moiety, $n$ and $n^1$ may be 1, but when said substituents alone or together do not contribute an anchoring moiety at least one of $n$ and $n^1$ must be 2.

9. A product as defined in claim 7 wherein the outermost of said emulsion layers comprises a relatively high speed silver halide emulsion; the intermediate of said emulsion layers comprises a relatively medium speed silver halide emulsion; and the emulsion layer nearest said support comprises a relatively low speed silver halide emulsion.

10. A product as defined in claim 9 wherein at least the color-providing material associated with said high speed emulsion layer is color-shifted so as to be substantially colorless prior to processing.

11. A product as defined in claim 10 wherein said color-providing material associated with said high speed emulsion and said color-providing material associated with said medium speed emulsion are both color-shifted so as to be substantially colorless prior to processing.

12. A product as defined in claim 9 wherein each of said color-providing material is a compound of the formula:

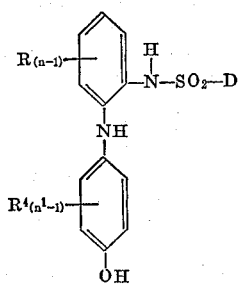

wherein:
each of R and R⁴ comprises an amide of at least 13 carbon atoms, said amide being bonded directly to a nuclear carbon atom of the shown benzene moiety or linked thereto through a phenylene or alkylene substituent;
each of $n$ and $n^1$ is 1 or 2, provided that at least one of said $n$ and $n^1$ is 2; and
D is a monoazo, disazo or anthraquinone dye moiety.

13. A product as defined in claim 9 including an image-receiving element comprising a support carrying a dyeable stratum.

14. A product as defined in claim 13 including means for applying an aqueous alkaline processing composition between said elements when in superposition.

15. A product as defined in claim 14 wherein said means comprises a frangible container confining said composition.

16. A product as defined in claim 9 wherein the varying ASA speed equivalents between said respective emulsions is of a magnitude of at least five stops on a standard step wedge.

17. A product as defined in claim 16 including an X-ray intensifier screen positioned with respect to said photosensitive element so as to intensify the degree of exposure of said photosensitive element to penetrating ionizing radiation.

18. A process for determining the extent of radiation dosage, if any, present in a given environment comprising positioning in said environment a photosensitive element including at least two light-sensitive silver halide emulsions of varying ASA speed ratings, each of said emulsions having associated therewith a layer of non-diffusible color-providing material which is capable upon contact with oxidized silver halide developing agent of being oxidized to provide an oxidation product which can auto-react intramolecularly to effect ring-closure and to eliminate the color-providing moiety of said material for transfer, said material in each of said layers having appreciably different spectral absorption characteristics, said photosensitive element being provided with opaque means for preventing photoexposure of said element to any visible light in said environment, said means being transparent to penetrating ionizing radiation; leaving said photosensitive element in said environment for a time sufficient for any penetrating ionizing radiation present in said environment to expose at least one of said emulsions to render developable the silver halide so exposed, the number of said emulsions so exposed being a function of the intensity of radiation present in said environment; thereafter, contacting said element with an aqueous alkaline processing composition including a silver halide developing agent, the oxidation product of which is reducible by said color-providing material; maintaining said contact while said photosensitive element is in superposition with an image-receiving element for a time sufficient for any of said exposed silver halide to be developed by said developing agent, for said developing agent to, in turn, be oxidized and thereafter to contact said associated color-providing material to eliminate the color-providing moiety of said material for transfer, and for any of said eliminated color-providing moieties to be transferred, by imbibition, to said image-receiving element to impart thereto a color, the spectral absorption characteristics of which are a function of said transferred color-providing moiety or moieties.

19. A process for determining the amount of radiation present in a given environment comprising:
providing a photosensitive element including a first light-sensitive silver halide emulsion, a second light-sensitive silver halide emulsion of appreciably less emulsion speed than said first emulsion and a third light-sensitive silver halide emulsion of appreciably less emulsion speed than said second emulsion, each of said emulsions having associated therewith a non-diffusible color-providing material which is capable of providing upon a redox reaction with oxidized silver halide developing agent an oxidation product which can auto-react intramolecularly to effect ring-closure and to eliminate the color-providing moiety of said material for transfer, said moiety in each of said materials having appreciably different spectral absorption characteristics;

predetermining the range of intensity of radiation exposure necessary to render developable only said first emulsion of an equivalent photosensitive element and the color obtained by transfer of the color-providing moiety associated therewith to a superposed stratum, the range necessary to render developable said first and second emulsions and the color obtained by transfer of the color-providing moieties of said materials associated with said two emulsions, and the range necessary to render developable all three of said emulsions and the color obtained by transfer of the color-providing moieties of said materials associated with all three of said emulsions, thereby establishing a control comprising three strata each having imparted thereto an appreciably different color, each of which colors reflects said predetermined range of intensity of radiation;

exposing said photosensitive element to radiation in said environment to render developable silver halide in at least one of said emulsions, the number of said emulsions in which silver halide is so rendered developable being a function of intensity of radiation present in said environment;

contacting said exposed element with an aqueous alkaline processing composition including a silver halide developing agent, the oxidation product of which is reducible by said redox reaction with said color-providing material to reduce exposed and developable silver halide in any of said emulsions and as a function thereof providing oxidized developing agent;

contacting said color-providing material associated with the emulsion containing said thus-developed silver halide with said oxidized developing agent to effect said redox reaction and thereby to eliminate for transfer the color-providing moiety thereof;

transferring by imbibition said eliminated color-providing moiety or moities, at least in part, to a superposed stratum to impart thereto a color, the spectral absorption characteristics of which is a function of the number of said emulsions exposed by said radiation and in turn the product of the associated color-providing moiety or moities transferred by development of said photosensitive element; and comparing the color of said stratum obtained as a function of said transfer with said control to determine the radiation dosage present in said environment.

20. A process as defined in claim 19 including the step of positioning between said photosensitive element and said radiation source an X-ray intensifier screen, causing a first portion of said radition to impinge against said screen, said screen upon excitation by said radiation emitting visible light to facilitate exposure of said element and causing a second portion of said radiation to pass through said screen to expose said photosensitive element, the degree of exposure of said photosensitive element thereby being a function of the radiation contacting said photosensitive element and the visible light emitted by said screen.

21. A process as defined in claim 19 wherein each of said non-diffusible color-providing materials is a compound of the formula:

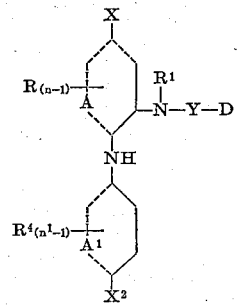

wherein:
each of A and $A^1$ represents the atoms necessary to complete an aromatic ring;
D is a color-providing moiety;
Y is a substituent which completes an amide with and reduces the basic character of the 3-amino substituent bonded thereto, said Y substituent further being a divalent radical linking said D moiety to said 3-nitrogen atom;
X and $X^2$ each is hydrogen, hydroxy, amino or the substituent R, provided that at least one of X and $X^2$ must be hydroxy or amino;
R and $R^4$ each represents an achoring moiety rendering said compound non-diffusible;
$R^1$ is hydrogen, alkyl or subtsituted alkyl; and $n$ and $n^1$ each is 1 or 2, provided that when $R^1$ is an alkyl radical or X or $X^2$ is a secondary or tertiary amino comprising an achoring moiety rendering said compound non-diffusible or when $R^1$, X and $X^2$ together contribute an anchoring moiety, $n$ and $n^1$ may be 1, but when said substituents alone or together do not contribute an anchoring moiety at least one of $n$ and $n^1$ must be 2.

22. A process for preparing color radiographs of an object having areas of varying opacity to X-radiation comprising:

positioning said object between a source of X-radiation and a photosensitive element including at least two light-sensitive silver halide emulsions of varying ASA speed ratings, each of said emulsions having associated therewith a layer of non-diffusible color-providing material which is capable upon contact with oxidized silver halide developing agent of being oxidized to provide an oxidation product which can auto-react intramolecularly to effect ring-closure and to eliminate the color-providing moiety of said material for transfer, said material in each of said layers having appreciably different spectral absorption characteristics;

exposing said object to a substantially uniform intensity of X-radaition from said source causing a first portion of said radiation to be absorbed by said object and a second portion of said radiation to pass therethrough, the intensity of said radiation passing therethrough varying in intensity as a function of the point-to-point opacity to X-radiation of said exposed areas of said object, thereby creating an imagewise intensity of radiation in terms of said varying areas of opacity, the greater intensity correspondng to areas of lesser opacity;

permitting said radiation passing through said object to expose said photosensitive element to expose at least one of said emulsions to render developable the silver halide so exposed, the number of said emulsions so exposed being a function of the point-to point intensity of radiation contacting said element, thereby forming a developable image of said object;

thereafter contacting said element with an aqueous alkaline processing composition including a silver halide developing agent, the oxidation product of which is reducible by said color-providing material; maintaining said contact while said photosensitive element is in superposition with an image-receiving element for a time sufficient for any of said exposed silver halide to be developed by said developing agent, for said developing agent to, in turn, be oxidized and thereafter to contact said associated color-providing material to eliminate the color-providing moiety of said material for transfer, and for any of said eliminated color-providing moieties to be transferred, by imbibition, to said image-receiving element to form thereon a multicolor radiograph.

23. A process for preparing multicolor radiographs of an object having areas of varying opacity to X-radiation comprising:
exposing in a photosensitive element to a source of X-radiation through said object to form a developable image, said photosensitive element including a first light-sensitive silver halide emulsion, a second light-sensitive silver halide emulsion of appreciably less sensitivity to actinic light than said first emulsion and a third light-sensitive silver halide emulsion of appreciably less sensitivity to actinic light than said second emulsion, each of said emulsions having associated therewith a non-diffusible color-providing material which is capable of providing upon a redox reaction with oxidized silver halide developing agent an oxidation product which can auto-react intramolecularly to effect ring-closure and to eliminate the color-providing moiety of said material for transfer, said moiety in each of said materials having appreciably different spectral absorption characteristics;
contacting said exposed element with an aqueous alkaline processing composition including a silver halide developing agent, the oxidation product of which is reducible by said redox reaction with said color-providing material to reduce exposed and developable silver halide in any of said emulsions and as a function thereof providing oxidized developing agent;
contacting said color-providing material associated with the emulsion containing said thus-developed silver halide with said oxidized developing agent to effect said redox reaction and thereby to eliminate for transfer the color-providing moiety thereof; and
transferring, by imbibition, said eliminated color-providing moiety or moieties, at least in part, to a superposed stratum to form thereon a multicolor radiograph of said object.

24. A process as defined in claim 23 including the step of positioning an X-ray intensifier screen in close optical proximity to said photosensitive element to facilitate exposure thereof.

25. A process as defined in claim 23 wherein each of said non-diffusible color-providing materials is a compound of the formula:

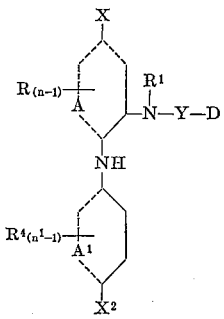

wherein:
each of A and $A^1$ represents the atoms necessary to complete an aromatic ring;
D is a color-providing moiety;
Y is a substituent which completes an amide with and reduces the basic character of the 3-amino substituent bonded thereto, said Y substituent further being a divalent radical linking said D moiety to said 3-nitrogen atom;
X and $X^2$ each is hydrogen, hydroxy, amino or the substituent R, provided that at least one of X and $X^2$ must be hydroxy or amino;
R and $R^4$ each represents an anchoring moiety rendering said compound non-diffusible;
$R^1$ is a hydrogen, alkyl or substituted alkyl; and
n and $n^1$ each is 1 or 2, provided that when $R^1$ is an alkyl radical or X or $X^2$ is a secondary or tertiary amino comprising an anchoring moiety rendering said compound non-diffusible or when $R^1$, X and $X^2$ together contribute an anchoring moiety, n and $n^1$ may be 1, but when said substitutents alone or together do not contribute an anchoring moiety at least one of n and $n^1$ must be 2.

References Cited

UNITED STATES PATENTS 3,347,673 10/1967 Downey _____ 96—29
3,362,819 1/1968 Land _____ 96—3

NORMAN G. TORCHIN, Primary Examiner

A. T. SURO PICO, Assistant Examiner

U.S. Cl. X.R.

96—2, 29, 76; 250—65